United States Patent [19]
Basile

[11] 3,888,064
[45] June 10, 1975

[54] MULTIPLE GRIP LENGTH MOUNTING BOLT

[75] Inventor: Peter A. Basile, Edison, N.J.

[73] Assignee: Amerace Corporation, New York, N.Y.

[22] Filed: Nov. 16, 1973

[21] Appl. No.: 416,439

[52] U.S. Cl. ............................ 52/758 F; 85/1 R
[51] Int. Cl.² .................. F16B 5/02; F16B 35/00
[58] Field of Search ............ 85/1 R, 9 R, 8.6, 8.9, 85/51, 50 AT; 52/758 F; 29/526

[56] References Cited
UNITED STATES PATENTS

| | | | |
|---|---|---|---|
| 1,219,223 | 3/1917 | Beery | 85/1 R X |
| 2,383,068 | 8/1945 | MacLean | 85/51 X |

*Primary Examiner*—Ramon S. Britts
*Attorney, Agent, or Firm*—S. Michael Bender; Gregory J. Battersby

[57] ABSTRACT

A mounting bolt for mounting an item upon one of at least two mounting boards of different thicknesses wherein the mounting boards are provided with keyhole type slots through which the bolt is passed and the bolt has a head providing a primary gripping surface for accommodating a board of one thickness and a collar providing an auxiliary gripping surface spaced from the primary gripping surface for accommodating another board of another thickness.

10 Claims, 6 Drawing Figures

MULTIPLE GRIP LENGTH MOUNTING BOLT

The present invention relates generally to mounting bolts and pertains, more specifically, to mounting bolts of the type employed to mount an item upon a mounting board provided with laterally extending slots, such as key-hole type slots, such that the bolts may first be affixed to the item and the bolt heads may then be inserted through the key-hole slots and moved laterally to grip the mounting board between each bolt head and the mounted item.

Many items presently are mounted upon mounting boards provided with laterally extending slots, such as key-hole slots, through the use of headed posts or bolts which are affixed to such items to provide a head spaced from the item. The head is first passed through one end of the slot, which would be the larger portion of the key-hole slot, then the item and the bolt are moved laterally into the other end of the slot, which would be the smaller portion of the key-hole slot, to capture the mounting board between the item and the head. In particular, coin-operated telephones are mounted upon mounting boards having key-hole slots provided for the reception of headed mounting bolts secured to the housings of such telephones. Such bolts are provided with a prescribed effective shank length in order to accept a given mounting board thickness between the bolt head and the telephone housing. Where the thickness of the mounting boards varies from board to board, it has been necessary to install those mounting bolts having an effective shank length corresponding to the thickness of the particular mounting board found at the installation site. This has led to the requirement for bolts of different sizes with consequent problems of assuring that the correct bolts are available at the installation site for proper installation. Since the preferred procedure is to install the bolts in the housings before the housings are delivered to the installation site, the problem is compounded by the need to know the mounting board thickness at the particular site where each telephone housing is destined. As a result, many improper installations have occurred, allowing not only damage to the telephone and customer inconvenience, but theft of the telephone and the telephone coin box as well.

It is therefore an object of the invention to provide a mounting bolt of the type described, but which permits proper mounting of an item on mounting boards of different thicknesses by automatically compensating for the variation in thickness.

Another object of the invention is to provide a mounting bolt for telephone housings which can be secured to the housings at the factory, or at another location remote from the telephone installation site, yet will assure proper installation of the telephone housing at the installation site regardless of the mounting board thickness found at the site.

Still another object of the invention is to provide a mounting bolt of the type described which enables a single size bolt to serve at sites having mounting boards of various thicknesses.

A further object of the invention is to provide a mounting bolt which eliminates the need for installer judgment and precludes both accidental and deliberate errors in installation.

A still further object of the invention is to provide a mounting bolt which is simple in design and construction, economical to manufacture and easy to use without alteration of current basic installation procedures.

The above objects, as well as still further objects and advantages, are attained by the invention which may be described briefly as a mounting bolt for mounting an item upon one of at least two mounting boards of different thicknesses wherein the mounting boards are provided with laterally extending slots through which the mounting bolt is passed, the mounting bolt comprising a shank extending longitudinally between opposite ends, a head at one end of the shank, the head including a primary gripping surface extending laterally relative to the shank, securing means at the other end of the shank for securing the shank to the item with the item at a fixed location on the shank relative to the gripping surface, and spacing means on the shank between the head and the fixed location, the spacing means including an auxiliary gripping surface movable laterally relative to the shank so as to be alternately placed and removed from between the primary gripping surface and the fixed location, the longitudinal distance between the primary gripping surface and the auxiliary gripping surface corresponding essentially to the incremental difference between the board thicknesses.

The invention will be more fully understood, while still further objects and advantages thereof will become apparent, in the following detailed description of an embodiment of the invention illustrated in the accompanying drawing, in which.

Figure 1:
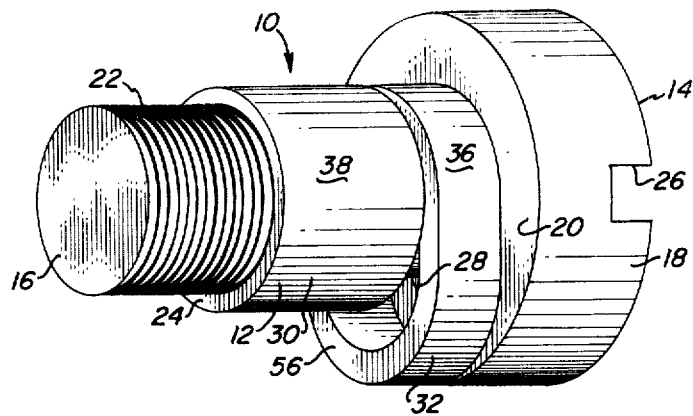
FIG. 1 is a perspective view of a mounting bolt constructed in accordance with the invention.
Figure 2:
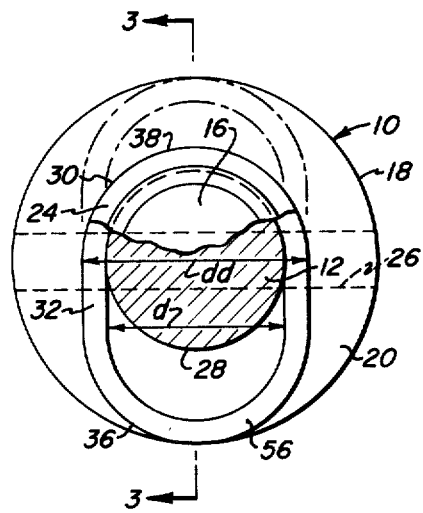
FIG. 2 is a partially sectioned end view of the mounting bolt.
Figure 3:
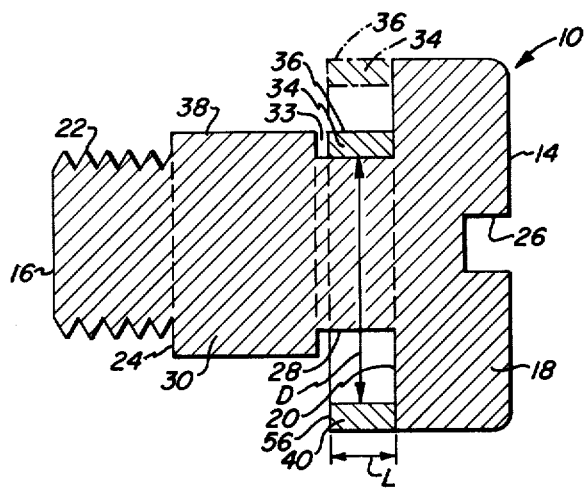
FIG. 3 is a cross-sectional view taken along line 3—3 of FIG. 2.

Referring now to the drawing, and especially to FIGS. 1 through 3 thereof, a mounting bolt constructed in accordance with the invention is illustrated at 10. Mounting bolt 10 has a shank 12 extending longitudinally from a first end 14 to a second end 16. A head 18 is located at the first end 14 and has a lateral primary gripping surface 20 facing the second end 16. Shank 12 is provided with securing means illustrated in the form of external threads 22 for affixing the bolt 10 to an item to be mounted, as will be described in greater detail hereinafter. Threads 22 extend from second end 16 to a shoulder 24 on the shank 12. Head 18 is provided with a slot 26 to facilitate turning of the bolt 10.

Shank 12 includes an annular recess 28 contiguous with gripping surface 20, the recess 28 having a diameter somewhat smaller than the intermediate central portion 30 of the shank 12, which central portion 30 extends longitudinally between the recess 28 and the shoulder 24. An oblong collar 32, which is in the form of an oval band-like member, is placed within the recess 28 and has a minor internal diameter $d$ corresponding to the diameter of the recess 28 such that the collar 32 is captured within the recess. The major internal diameter D of the collar 32 is greater than the diameter of recess 28, thereby allowing lateral movement of the collar relative to the shank, as illustrated in phantom in FIGS. 2 and 3. The longitudinal length L of the collar is just short of the longitudinal extent of recess 28, thus allowing some clearance 33 which enables the collar to be seated in the recess by gravity when the bolt 10 is oriented horizontally, as viewed in FIGS. 1 to 3. The lateral wall thickness of the collar 32 and the major diameter D are chosen so that when one side 34 of the collar is seated in the recess 28, the outside surface 36 of the collar at that side is flush with the outside surface 38 of central portion 30, and the other side 40 of the collar extends laterally beyond outside surface 38, but not beyond the overall diameter of head 18.

Figure 4:
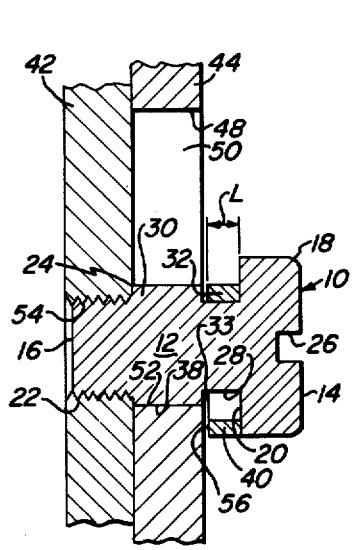
FIG. 4 is an elevational cross-sectional view illustrating the mounting bolt in an installation having a thinner mounting board.
Figure 5:
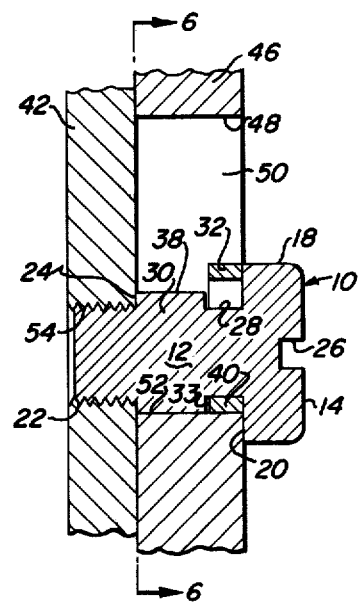
FIG. 5 is an elevational cross-sectional view illustrating the mounting bolt in an installation having a thicker mounting board.
Figure 6:
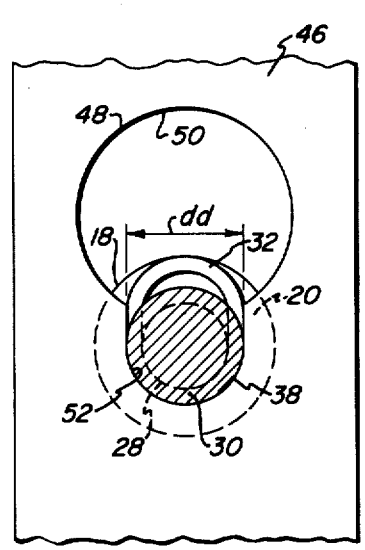
FIG. 6 is a cross-sectional view taken along line 6—6 of FIG. 5.

Turning now to FIGS. 4 through 6, bolt 10 is secured to an item to be mounted upon a mounting board. In this instance, the item is a telephone housing 42 which is to be mounted upon either one of two mounting boards — a thinner mounting board 44 or a thicker mounting board 46. Both mounting boards are provided with a laterally extending slot in the form of a key-hole slot 48 for each mounting bolt, each key-hole slot having a larger upper portion 50 and a smaller lower portion 52.

Telephone housing 42 is provided with a threaded aperture 54 for each bolt 10 to be secured thereto and a bolt 10 is threaded into each threaded aperture 54 until the shoulder 24 engages the housing 42 and the bolt is secured in place. Installation of the bolts 10 into the housing 42 is accomplished at the factory or at some other location remote from the site where the telephone housing is to be mounted to a mounting board. The mounting board at a particular installation site will be either the thinner board 44 or the thicker board 46.

When the telephone housing 42 is mounted upon thinner mounting board 44, as seen in FIG. 4, the bolt head 18 of each bolt 10 is first passed through the larger upper portion 50 of each key-hole slot 48. Then the housing 42 is lowered so that the central portion 30 of the shank 12 of the bolt enters the smaller lower portion 52 of the key-hole slot 48. The key-hole slot portion 52 is complementary to central portion 30 of the bolt 10 and the central portion becomes seated in the slot. AS a part of the installation procedure, the housing 42 is pressed against the mounting board 44. Since the longitudinal length of the central portion 30 of the shank 12 is made to match the thickness of mounting board 44, the collar 32 will clear the board 44 and will drop downwardly so that side 40 thereof will serve as a spacer between the board 44 and primary gripping surface 20, with the edge 56 of side 40 providing an auxiliary gripping surface located between the shoulder 24 and primary gripping surface 20. Thus, the bolt 10 will be secured against longitudinal movement relative to the board 44 and the telephone housing 42 will be secured to the board 44. The slight clearance 33 assures that the collar 32 will indeed fall between the board 44 and the head 18, but has a negligible effect upon securement of the telephone housing 42 to the board 44.

When the telephone housing 42 is mounted upon the thicker mounting board 46, the same installation procedure is followed; however, in this instance, the collar 32 is raised as the telephone housing is lowered and the central portion 30 of the shank 12 is seated in the smaller lower portion 52 of the key-hole slot 48. The longitudinal length of the shank 12 between the shoulder 24 and the primary gripping surface 20 of head 18 corresponds to the thickness of the thicker board 46 which is received and gripped between the telephone housing 42 and the head 18 of the bolt 10 to secure the housing in place upon the mounting board. Since the outside minor diameter dd of the collar 32 matches the diameter of central portion 30 of the shank, and hence the corresponding diameter of the lower portion 52 of key-hole slot 48 and since the side 40 of the collar will become flush with the central portion 30 of the shank 12, the collar 32 will not interfere with the proper seating of the bolt within the key-hole slot. Again, clearance 33 facilitates the lateral movement of collar 32.

It will be seen that the construction of mounting bolt 10 permits securement of the bolt in the telephone housing at any location remote from the telephone installation site, without requiring knowledge of the thickness of the mounting board present at the site. Where there is a chance that the mounting board will have a thickness chosen from more than two possibilities, construction of the bolt can be modified to add further collars to accommodate each variation in thickness. Thus, the spacing between the primary gripping surface 20 and the shoulder 24 would correspond to the thickness of the thickest mounting board, and the longitudinal length L of each collar would correspond to the incremental difference between the thickness of the thickest mounting board and the thickness of each successively thinner mounting board, less a small clearance.

The installation procedure at the installation site will remain the same regardless of the thickness of the mounting board, thus relieving the installer of the need to make any judgments concerning installation with the proper mounting bolts. Security of the installation is increased since opportunities for deliberate as well as accidental errors are diminished.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for mounting an item upon either of at least two mounting boards of differing thicknesses, said apparatus comprising, in combination:
   a. at least two mounting boards of differing thicknesses, each of said boards containing at least one laterally extending keyhole configured slot passing through the thickness thereof, each of said slots having a larger diametered portion interconnected with a smaller diametered portion;
   b. an item adapted to be mounted in juxtaposition with at least one of said mounting boards, said item having a portion, including securing means, adapted to be positioned adjacent to either of said boards;
   c. a mounting bolt adapted to mount said item on either of said boards, said bolt comprising:
      i. a shank extending longitudinally between opposite ends thereof, said shank being dimensioned to be positioned within the smaller diametered portion of said slot;

ii. a head at one end of said shank, the diameter of said head being smaller than the diameter of the larger diametered portion of said slot and larger than the diameter of the smaller diametered portion of said slot, said head defining a primary gripping surface extending laterally relative to said shank, said primary gripping surface adapted to engage the thicker of said mounting boards adjacent said smaller diametered portion of said slot;

iii. securing means at the other end of said shank adapted to engage the securing means of said portion of said item so as to secure said mounting bolt to said item with said item at a fixed position on said shank relative to the gripping surface; and iv. spacing means on said shank between said head and said fixed position, said spacing means including a collar having an auxiliary gripping surface thereon, said collar being captively contained within a recess on said shank and being movable laterally relative to the shank so as to be alternately placed and removed from between the primary gripping surface and said fixed position, said auxiliary gripping surface being adapted to engage the thinner of the said mounting boards adjacent the smaller diametered portion of said slot; the longitudinal distance between the primary gripping surface and the auxiliary gripping surface corresponding essentially to the incremental difference between said board thicknesses.

2. The invention of claim 1 wherein said collar includes a portion extending in a lateral direction beyond the shank and being movable laterally within said recess to a position wherein said portion is flush with said shank, said auxiliary gripping surface being on said portion of the collar.

3. The invention of claim 2 wherein said collar extends longitudinally from the auxiliary gripping surface to the primary gripping surface.

4. The invention of claim 2 wherein said collar is oblong, said collar extends beyond the shank in the direction of the major dimension of the collar and is captured within the recess along the minor dimension of the collar.

5. The invention of claim 4 wherein said collar extends longitudinally from the auxiliary gripping surface to the primary gripping surface.

6. The invention of claim 5 wherein the securing means of said bolt at the other end of said shank comprises an external thread on the shank and wherein the securing means of said item comprises an internal thread contained within an aperture adapted to threadably engage said external thread in such a manner that said fixed location is determined by a shoulder between the thread and the remainder of the shank.

7. The invention of claim 6 wherein the said item is a telephone housing.

8. A method of mounting an item upon either of at least two mounting boards of differing thicknesses, each of said boards containing at least one laterally extending keyhole configured slot passing through the thickness thereof, each of said slots having a larger diametered portion interconnected with a smaller diametered portion, said method comprising the following steps:

a. providing a mounting bolt adapted to mount said item on either of said boards, said bolt comprising:

i. a shank extending longitudinally between opposite ends thereof, said shank adapted to be positioned within the smaller diametered position of said slot;

ii. a head at one end of said shank, the diameter of said head being smaller than the diameter of the larger diametered portion of said slot and larger than the diameter of the smaller diametered portion of said slot, said head defining a primary gripping surface extending laterally relative to said shank, said primary gripping surface adapted to engage the thicker of the said mounting boards adjacent said smaller diametered portion of said slot;

iii. securing means at the other end of said shank adapted to engage securing means on said item so as to secure said mounting bolt to said item with said item at a fixed position on said shank relative to the gripping surface; and iv. spacing means on said shank between said head and said fixed position, said spacing means including a collar having an auxiliary gripping surface thereon, said collar being captively contained within a recess on said shank and being movable laterally relative to the shank so as to be alternately placed and removed from between the primary gripping surface and said fixed position, said auxiliary gripping surface being adapted to engage the thinner of the said mounting boards adjacent the smaller diametered portion of said slot; the longitudinal distance between the primary gripping surface and the auxiliary gripping surface corresponding essentially to the incremental difference between said board thicknesses;

b. engaging the securing means of said bolt to securing means on said item contained within an aperture located on the portion of said item adapted to be positioned adjacent to either of said boards;

c. longitudinally passing the head of said bolt through the larger diametered portion of said slot until said item firmly abuts said board;

d. securing said item to either of said boards wherein said securing comprises the steps of seating of shank of said bolt within the smaller diametered portion of said slot and positioning the collar defining the auxiliary gripping surface of said bolt between the primary gripping surface of said bolt and said board when said item is mounted on the thinner of said at least two mounting boards, and alternately positioning the collar within said slot when said item is mounted on the thicker of said at least two mounting boards.

9. The method of claim 8 wherein said collar extends longitudinally from the auxiliary gripping surface to the primary gripping surface.

10. The method of claim 9 wherein the securing means of said bolt at the other end of said shank comprises an external thread and wherein the securing means of said item comprises an internal thread contained within said aperture and wherein said item is secured to said bolt by threadably engaging the external thread of said bolt with the internal thread of said item.

* * * * *